United States Patent [19]

Nagaoka

[11] Patent Number: 5,415,083
[45] Date of Patent: May 16, 1995

[54] APPARATUS FOR ROUTERING SPROUTS FROM TUBERS

[76] Inventor: Tatsuo Nagaoka, 13-12, Minowa-cho 2-chome, Kohoku-ku, Yokohama-shi, Kanagawa, 223, Japan

[21] Appl. No.: 313,964

[22] Filed: Sep. 28, 1994

[30] Foreign Application Priority Data

Sep. 29, 1993 [JP] Japan .................................. 5-264109

[51] Int. Cl.⁶ ............................................. A23N 15/00
[52] U.S. Cl. ........................................ 99/491; 99/537; 99/567; 99/584
[58] Field of Search .................. 99/485, 486, 489–491, 99/537–539, 567, 584, 588–593, 594–599, 646 R; 426/481–483

[56] References Cited

U.S. PATENT DOCUMENTS

| | | | |
|---|---|---|---|
| 3,237,664 | 3/1966 | Macy et al. | 99/489 X |
| 3,881,406 | 5/1975 | Perez | 99/594 |
| 4,541,331 | 9/1985 | Narisawa et al. | |
| 4,656,936 | 4/1987 | Bardon | 99/584 X |
| 4,831,922 | 5/1989 | Cogan et al. | 99/486 |

*Primary Examiner*—Timothy F. Simone
*Attorney, Agent, or Firm*—Lowe, Price, LeBlanc & Becker

[57] ABSTRACT

An apparatus for routering sprouts from tubers comprises a plurality of sprout routering units, each scanning the surface of a tuber and removing sprouts therefrom if any, and a rotary table on which these sprout routering units are mounted and which rotates them horizontally about a support column. Each sprout routering unit comprises a mechanism which holds a tuber between the ends of upper and lower rods, rotates the tuber at a constant speed and moves the tuber along the common axis of the rods, a sprout detecting part provided with a camera which detects tuber sprouts by color differentials, and a sprout routering part which routs detected sprouts to their roots with a drill. A plurality of these sprout routering units are mounted at equal intervals in the direction of rotation on a rotary table rotatably mounted on a support column projecting upward from a base, and rotate together with the rotary table. Provided along the peripheral part of the rotary table and in fixed positions with respect to the base are a tuber feed device for feeding tubers into the sprout routering units, one at a time, and a tuber discharge device for picking tubers that have been processed in the sprout routering units out of the rotary table, i.e. out of the apparatus.

6 Claims, 10 Drawing Sheets

APPARATUS FOR ROUTERING SPROUTS FROM TUBERS

FIELD OF THE INVENTION

This invention relates to an apparatus for routering sprouts from tubers which scans the surface of a tuber such as a potato, a sweet potato or a taro with a camera and when it detects a sprout in the surface of the tuber automatically removes the detected sprout with a blade such as a drill.

DESCRIPTION OF THE RELATED ART

An apparatus wherein detecting means detects the presence of a sprout in a specific location on the surface of a tuber such as a potato and based on this detection result a device for moving a drill is operated and the end of a drill-like blade is automatically brought to the location of the sprout and the sprout is removed is disclosed for example in U.S. Pat. No. 4,541,331. Describing this conventional device briefly with reference to FIG. 10, the device consists of a holding unit 114 which holds a potato and a drilling unit 102 for removing sprouts from the potato. This holding unit 114 has a stand 116 which includes an upper support 117 and a lower support 118. A driving motor 119 and an upper rotating member 121 are mounted on the upper support 117, and a lower rotating member 126 is mounted on the lower support 118. A potato 131 has its upper part held by hydropneumatic cylinders 123 and piston rods 124 fixed to the upper rotating member 121 and its lower part held by hydropneumatic cylinders 128 and piston rods 129 fixed to the lower rotating member 126. The potato 131 can be rotated about an axis joining the upper rotating member 121 and the lower rotating member 126 by a driving motor 119 mounted on the upper support 117.

The drilling unit 102 comprises a motor 110 mounted on a moving member 109 fitted on a thread of a screw rod 106 and a drill-like blade 113 mounted in a chuck 112 on the output shaft of the motor 110.

When the operator finds a sprout on the surface of the potato 131 held and rotated in the holding unit 114, the operator stops the rotation of the potato 131 by stopping the driving motor 119, rotates the handle 108 of the drilling unit 102 by hand to bring the drill-like blade 113 to the position of the sprout, and gouges the potato 131 out to remove the sprout by operating the motor 110 to rotate the drill-like blade 113.

Also disclosed as a preferred embodiment in the U.S. Patent mentioned above is an apparatus wherein the surface of the potato is scanned by a photosensor and when a sprout is detected the rotation of the potato held in the holding unit 113 is stopped, the drill-like blade 113 is brought to the position of the detected sprout and the sprout is removed by the drill-like blade 113 rotated by operating the motor 110.

The known technology mentioned above provides a technology for automatically removing sprouts from a single tuber such as a potato, but means for efficiently and continuously processing a large number of potatoes is not disclosed.

OBJECTS AND SUMMARY OF THE INVENTION

An object of this invention is to provide an apparatus, which detects sprouts by scanning the surface of a tuber such as a potato with a sprout detection sensor and, when a sprout is detected, moves the end of a drill-like blade to the location where the sprout has been detected in response to the detection signal and rotates the drill-like blade to remove the sprout, thereby efficiently enabling a large quantity of tubers to be processed automatically and continuously.

In order to achieve this object, an apparatus for routering sprouts from tubers according to this invention has a plurality of sprout routering units, which scan the surface of a tuber and remove any sprouts that they detect, are mounted by being spaced uniformly and circumferentially on a rotary table which rotates horizontally about a fixed axis. Specifically, each of such sprout routering units comprises an upper rod with its lower end fitted with a holding part for holding the upper portion of a tuber, a lower rod having an axis common with the axis of the upper rod and its upper end fitted with a holding part for holding the lower portion of a tuber, a tuber sprout detecting part provided with a camera having an optical axis directed to a tuber gripped between the holding parts on the upper and lower rods, and a tuber sprout routering part which advances toward the tuber gripped by the holding parts on the upper and lower rods and router a sprout in the surface of the tuber down to its root with a drill-like blade. The upper rod rotates in a predetermined direction at a constant speed and simultaneously descends axially at a constant speed, so that the tuber held by the holding parts moves spirally with respect to the optical axis of the camera. As a result, the entire surface of the tuber is scanned by the camera. This camera detects a sprout by discriminating the surface color of the tuber from the color of the sprout. When the presence of a sprout in the surface of the tuber is detected, the tuber is rotated until the sprout reaches the extension line of the axis of the drill. The drill in rotation is then advanced to the sprout and is inserted to a predetermined depth into the tuber and the sprout is scraped off to the extent of its root. The rotary table on which these sprout routering units are mounted and which rotates all the sprout routering units around the base of the apparatus is rotatably mounted on a support column projecting upward from the base and is rotationally driven in a fixed direction and at a constant speed. Also, provided outside the rotary table and at fixed positions with respect to the base are a tuber feed device for feeding tubers into the sprout routering units one at a time and a tuber discharge device for discharging processed tubers outside the rotary table, i.e. out of the apparatus.

As the apparatus for routering sprouts from tubers according to the present invention is provided with such structure as described above, each of the sprout routering units of the apparatus can complete a series of processes including receiving a tuber, detecting the presence of sprouts in the tuber, removing the detected sprouts from the tuber and discharging the tuber out of the apparatus within a very short period of time. Further, as this apparatus can process the number of tubers equal to the number of sprout routering units consecutively during one revolution of the rotary table, a highly efficient routering operation is realized.

DETAILED DESCRIPTION OF THE PREFERRED EMBODIMENTS

Figure 1:
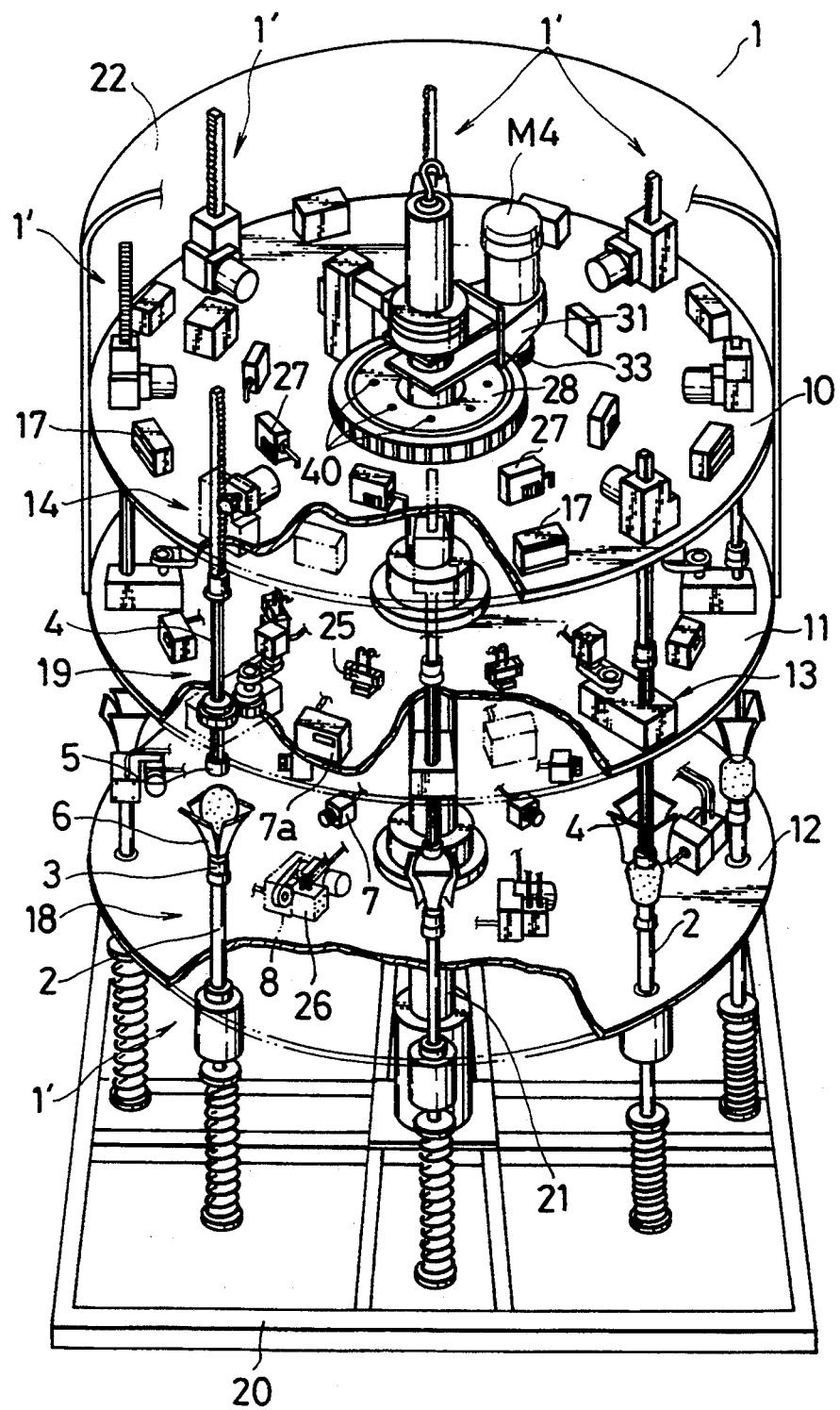
FIG. 1 is a perspective view of an apparatus for routering sprouts from tubers according to a preferred embodiment of the invention.
Figure 2:
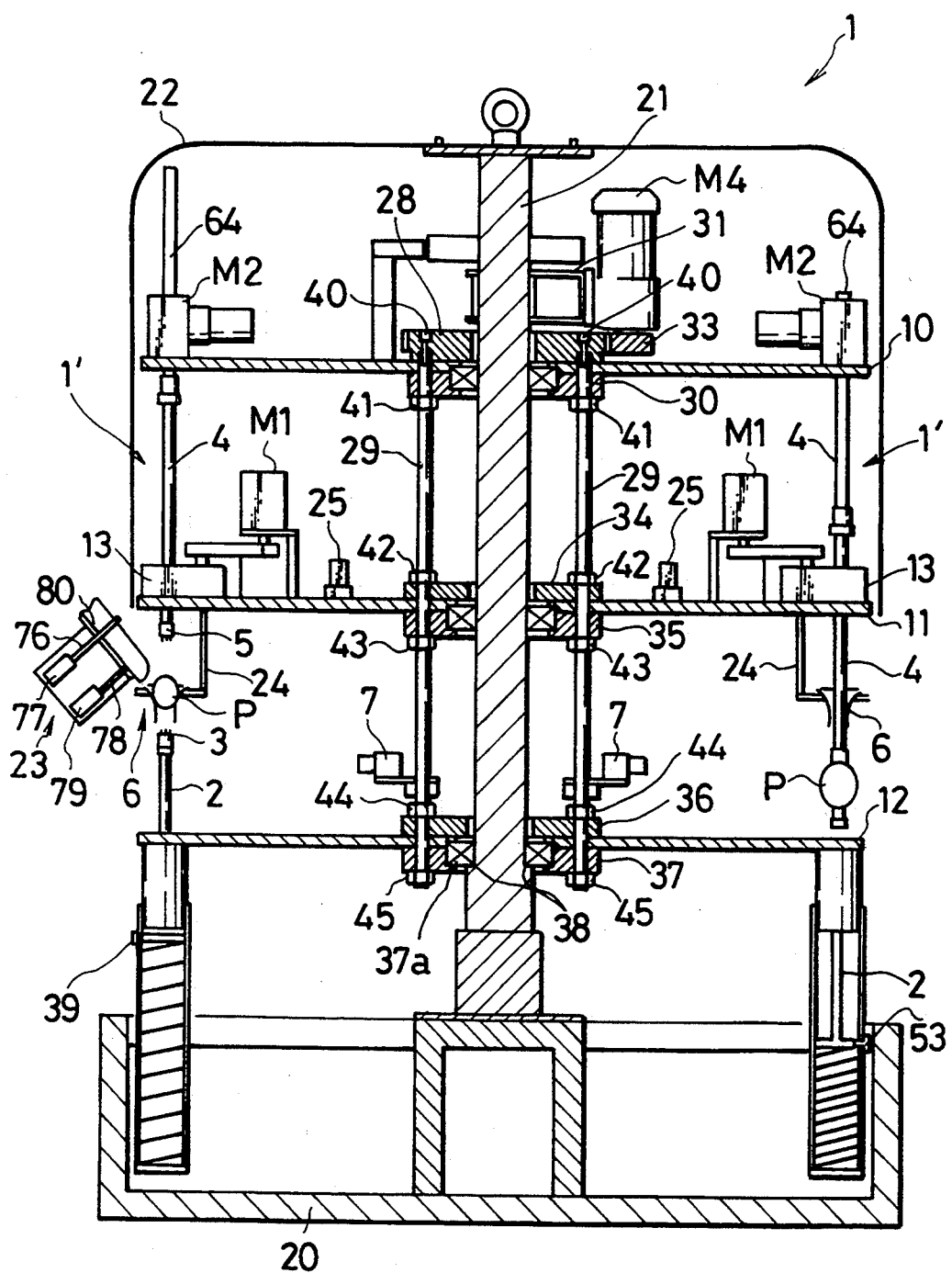
FIG. 2 is a sectional view of the apparatus for routering sprouts from tubers shown in FIG. 1.

FIG. 1 is a perspective view showing the whole of a tuber sprout routering apparatus 1 according to the invention. In the following this tuber sprout routering apparatus 1 is described as an apparatus for routering sprouts from potatoes. FIG. 2 is a sectional view of an essential part of the tuber sprout routering apparatus of FIG. 1.

The base of a vertical support column 21 is fixed to the central portion of a base 20 of the tuber sprout routering apparatus 1. Three circular plates, an upper rotary table 10, a middle rotary table 11 and a lower rotary table 12, are rotatably mounted at differentiated levels on the support column 21. As shown in FIG. 2, a hood 22 which covers the upper and middle rotary tables 10, 11 is fixed to the top of the support column 21. The lower rotary table 12 not covered by the hood 22 is exposed to the outside, and as shown in FIG. 2 a feed device 23 for feeding potatoes into the tuber sprout routering apparatus 1 located diagonally above one side of the lower rotary table 12 is fixed with respect to the base 20. Also, the tuber sprout routering apparatus 1 includes eight sprout routering units 1', all of which are of identical construction and located by being spaced uniformly and circumferentially around the support column 21. The components constituting each sprout routering unit 1' are mounted by being distributed among the upper, middle and lower rotary tables 10, 11, 12 as described below.

Figure 3:
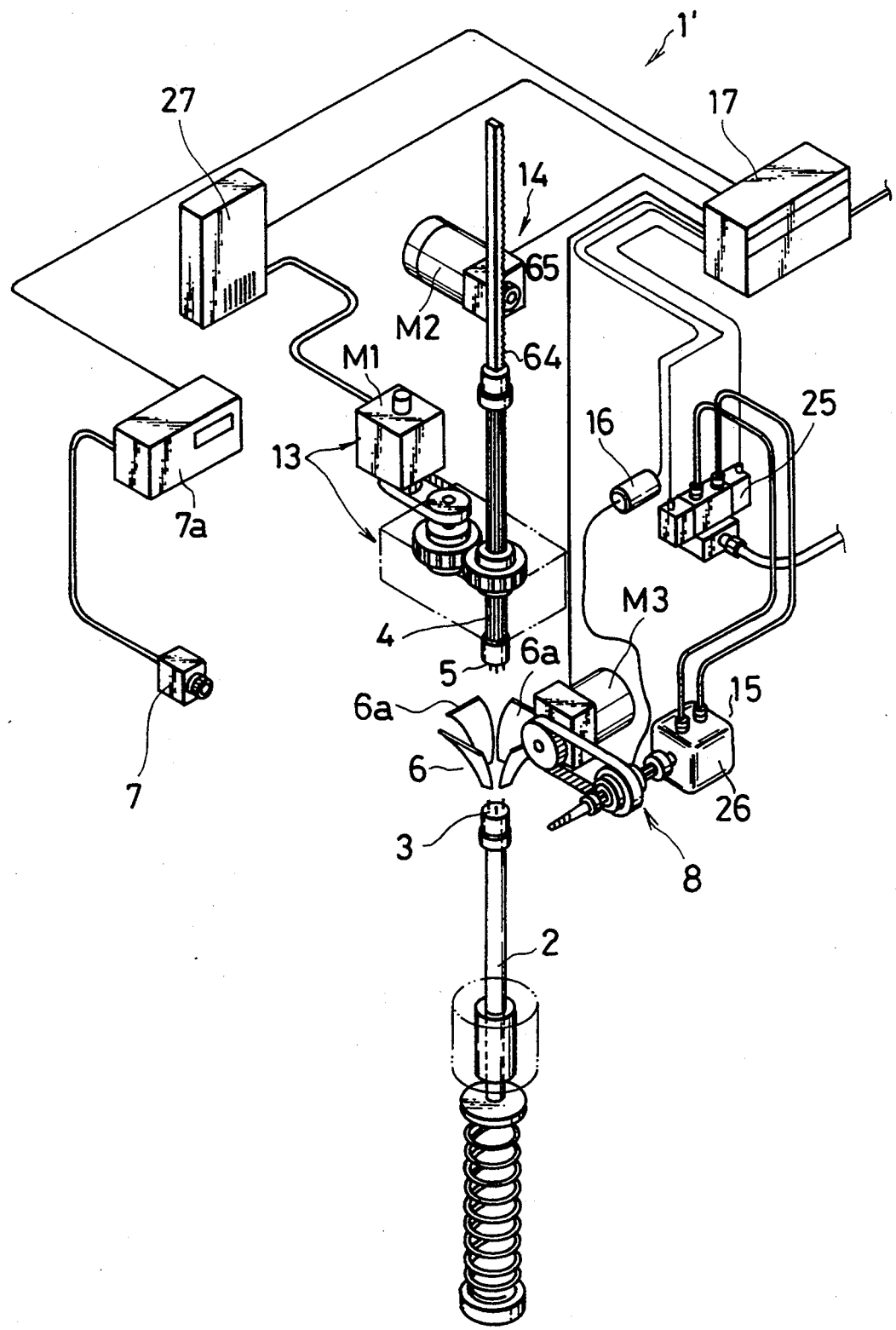
FIG. 3 is a perspective view schematically showing a sprout routering unit constituting the apparatus for routering sprouts from tubers of an embodiment shown in FIG. 1.

A sprout routering unit 1' will now be outlined in reference to FIG. 3.

A potato is held between a lower portion holding part 3 fitted through a bearing 90 to the upper end of a lower rod 2 and an upper portion holding part 5 fixed to the lower end of an upper rod 4. The axis of the lower rod 2 alignes with an extension line of the axis of the upper rod 4. The processes until a potato supplied to the sprout routering apparatus 1 comes to be held between the lower portion holding part 3 and the upper portion holding part 5 will be described later.

The upper rod 4 is rotationally driven by a motor M1. As a result, since the lower rod 2 has the lower portion holding part 3 fitted to its upper end via the bearing 90, the upper portion holding part 5, the lower portion holding part 3 and the potato held between the two holding parts 5 and 3 rotate integrally about the common axis of the upper rod 4 and the lower rod 2.

A CCD camera 7 detects sprouts in the surface of the potato held and rotated in the holding parts 3 and 5. The optical axis of the CCD camera 7 is oriented almost horizontally but perpendicular to the common axis of the lower rod 2 and the upper rod 4. A detecting part 7a analyzes the image signal from this CCD camera 7 and judges whether or not a sprout is present in the surface of the potato.

Dyrubg shooting by the CCD camera 7, when the detecting part 7a detects that there is a sprout in the part of the potato surface being shot by the CCD camera 7, the potato is further rotated through approximately 90° and the detected sprout is brought to face the drill 8 of a sprout routering part. Then, the drill 8 advances until the tip of the drill 8 contacts with the sprout and removes the sprout to the extent of its root. The axis of this drill 8 is perpendicular to the common axis of the lower rod 2 and the upper rod 4 and also intersects with the optical axis of the CCD camera 7. The drill 8 is rotationally driven by a motor M3. Advance and withdrawal movement of the drill 8 is performed by operation of an air cylinder 26. This air cylinder 26 is connected to the base end of the drill 8 and can cause the drill 8 to move forward from its retracted position toward the potato and to move backward to its retracted position again after a sprout is removed. The air cylinder 26 is driven by an electromagnetic valve 25. A contact sensor 16 which detects when the tip of the drill 8 has made contact with the potato is disposed inside the drill 8, so that the time point at which the drill 8 starts to enter the potato can be known.

Figure 9:
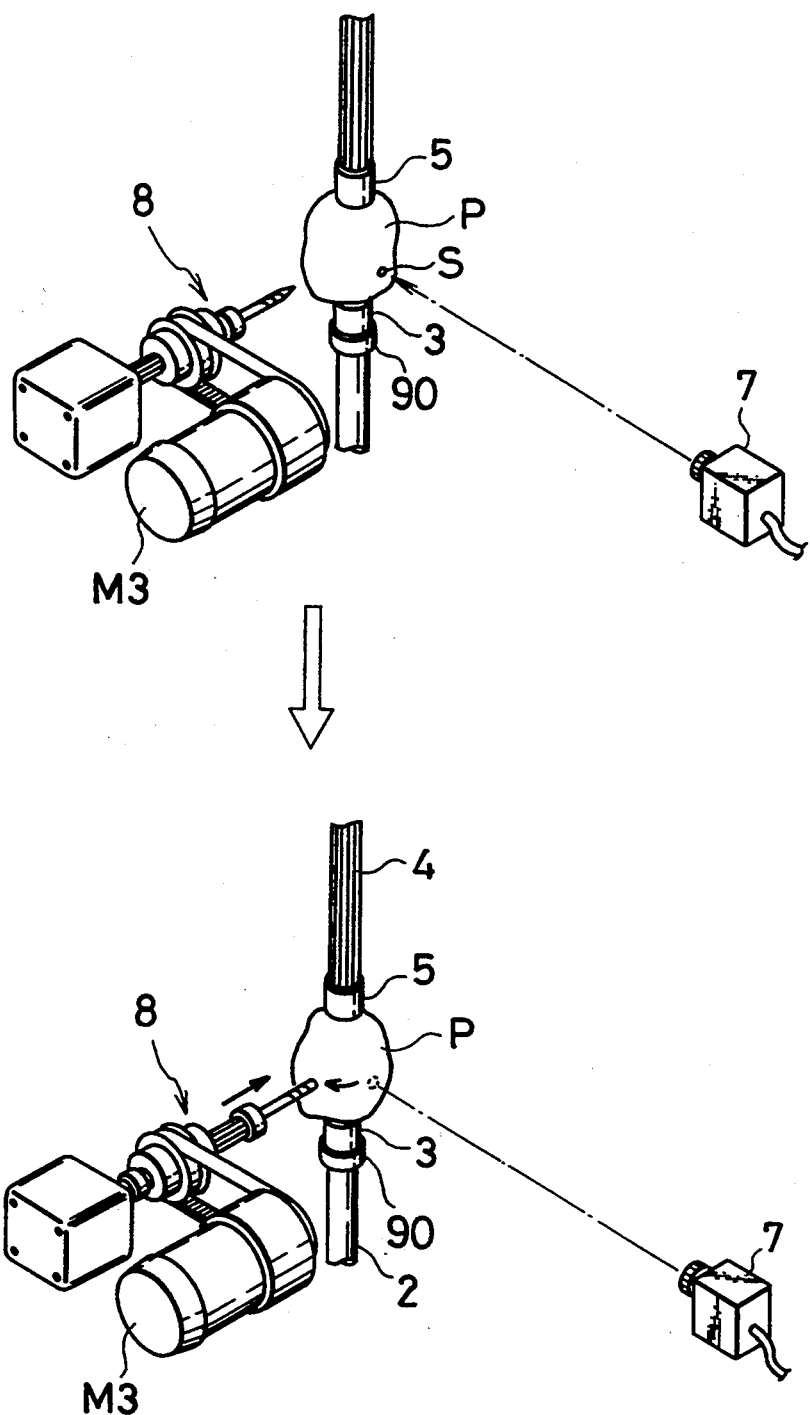
FIG. 9 is a perspective view illustrating the positional relationship between a sample tuber, a camera of a sprout detecting part and a sprout routering part and a drill constituting the sprout routering unit of FIG. 3.
Figure 10:
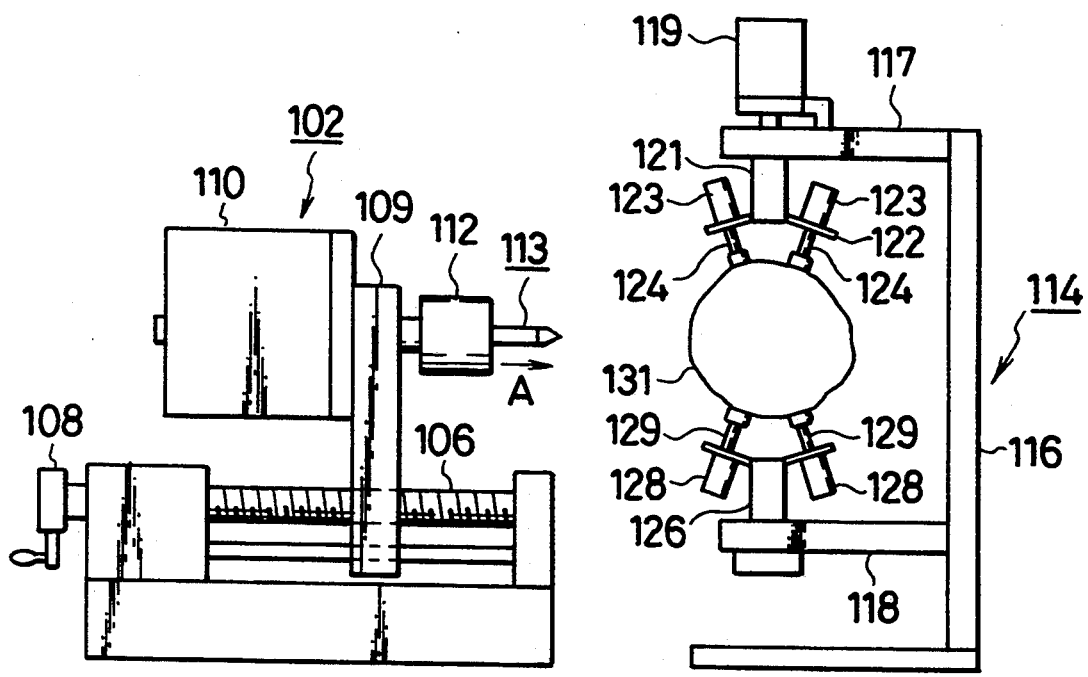
FIG. 10 is a frontal view of a conventional apparatus for routering tuber sprouts.

FIG. 9 schematically illustrates the operation in which the CCD camera 7 finds a sprout in the surface of a potato and the drill 8 then cuts out the sprout. The upper drawing in FIG. 9 shows the state when a sprout S is detected in a location (a location passed over by the optical axis of the CCD camera 7) on the surface of a potato P. The drill 8 is not driven at this time and is in its retracted position. The lower illustration in FIG. 9 shows the state, in which, after detecting the sprouts in the potato P, the potato P held between the upper portion holding part 5 and the lower portion holding part 3 is rotated by 90° with respect to the common axis of the lower rod 2 and upper rod 4 to align the position of the sprouts with the extension line of the axis of the drill 8. In this state, if the drill is moved forward along its axis, the contact sensor operates when the drill comes into contact with the potato P and outputs the signal representing the point at which the drilled depth is zero to the drill 8. When the drill 8 is kept rotated further, the drill 8 advances into the potato P through its surface where the sprout exists and router to the root of the sprout.

Figure 4:
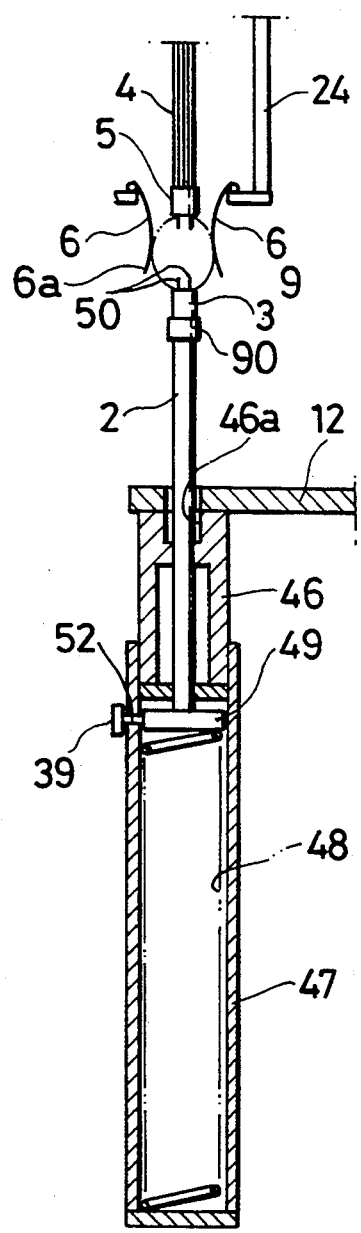
FIG. 4 is a partial sectional view showing an essential portion of the sprout routering unit shown in FIG. 3.

Next, the parts constituting the sprout routering unit 1', outlined above, will be described in detail. As shown in FIG. 4, the lower rod 2 passes through the lower rotary table 12 and extends upward and downward therefrom. The lower portion holding part 3 which supports and holds the lower portion of the potato is connected to the upper end of the lower rod 2 through the bearing 90. The lower portion holding part 3 is made rotatable with respect to the lower rod 2 by the bearing 90. A cylindrical support 46 is fixed to the underside surface of the portion of the lower rotary table 12 through which the lower rod 2 passes. The lower portion of the lower rod 2 passing through the lower rotary table 12 also passes through the inside of the support 46. The upper portion of a cylinder 47 with a coil spring 48 installed therein is externally fitted to the lower portion of this support 46. The axis of the support 46 coincides with the common axis of the upper rod 4 and the lower rod 2, as well as with the axis of the cylinder 47.

The end of the lower rod 2, which passes through the support 46, reaches the upper portion of the cylinder 47. A pushing plate 49 is fixed to the lower end of the lower rod 2, and the lower surface of the pushing plate 49 is in contact with the upper end of the coil spring 48 installed in the cylinder 46.

Figure 8:
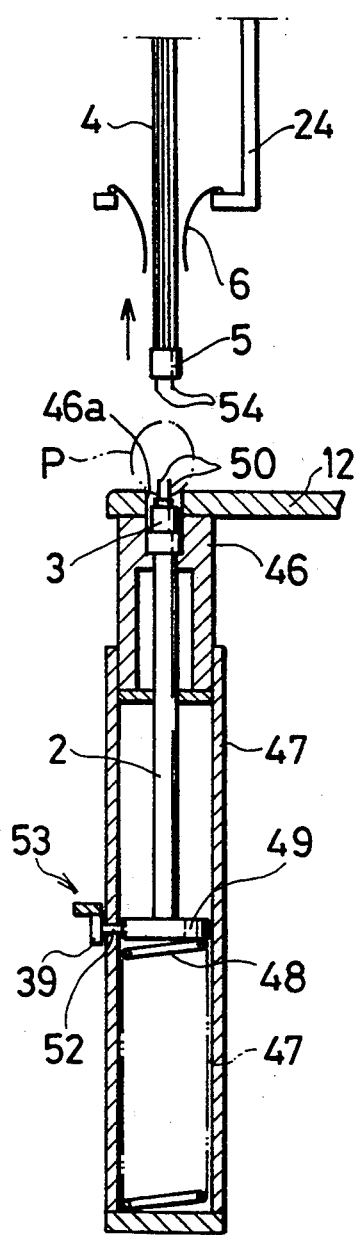
FIG. 8 is a partial sectional view showing an essential portion of the sprout routering unit of FIG. 3.

As shown in FIG. 4, when the coil spring 48 is not compressed by the lower rod 2, the upper half of the lower rod 2 projects upward from the upper surface of the lower rotary table 12. When the lower rod 2 is pushed downward by an external force, the pushing plate 49 moves toward the lower portion of the cylinder 47 to compress the coil spring 48. A recess portion 46a having such a diameter and a depth as will receive the lower portion holding part 3 and the bearing 90 fitted to the upper end of the lower rod 2 is formed in the center of the upper end of the support 46. As a result, as shown in FIG. 8, when the lower rod 2 is pushed downward as far as possible, the lower portion holding part 3 and the bearing 90 fitted to the lower rod 2 are fully received into the recess portion 46a in the support 46. That is, the upper end of the lower rod 2 is at a lower level than the upper surface of the lower rotary table.

Figure 6:
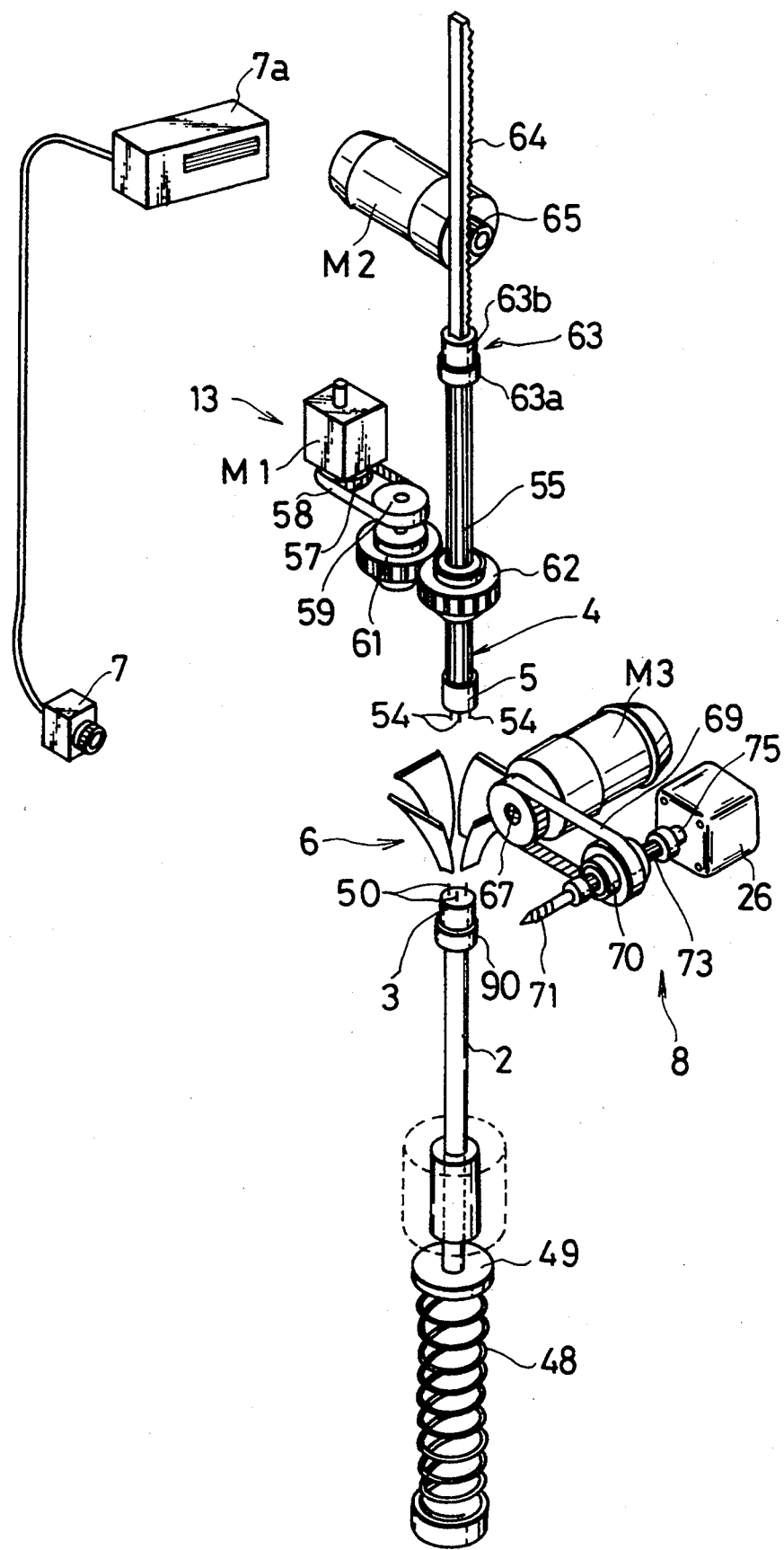
FIG. 6 is a perspective view showing an essential portion of the sprout routering unit of FIG. 3.

The upper rod 4 is on an axis common with that of the lower rod 2, and, as shown in FIG. 2, passes through the middle rotary table 11 to extend upward and downward therefrom. As shown in FIG. 6, splines 55 are formed along the entire length of this upper rod 2. A gear 62 is fitted into the splines 55 so as to be movable along the spline grooves.

An upper rod rotational drive device 13 which rotates the upper rod 4 by transmitting its touque to the gear 62 is mounted on the middle table 11. As shown in FIG. 6, this upper rod rotational drive device 13 comprises a motor M1 having a pulley 57 mounted on its output shaft, a pulley 59 linked to the pulley 57 through a timing belt 58, and an intermediate gear 61 which is coaxial with this pulley 59 and meshes with the gear 62. As shown in FIG. 3, the motor M1 for rotating the upper rod 4 is connected via a driver 27 to a controller 17 and is controlled by commands from the controller 17.

As shown in FIG. 6, the lower end of a rack 64 is joined to the upper end of the upper rod 4 through a joining piece 63. At a mid-point along the rack 64 a pinion 65 which meshes with the rack 64 is mounted on the motor shaft 66 of a motor M2. The joining piece 63, which joins the upper rod 4 to the rack 64 with the spline 55 formed thereon, consists of a spline connecting portion 63a and a rack connecting portion 63b, thereby enabling the upper rod 4 with the spline 55 formed thereon to rotate with respect to the rack 64. The motor M2 is mounted on the upper rotary table, connected to the controller 17, as shown in FIG. 3, and driven to rotate in forward and reverse directions, thereby causing the upper rod 4 to ascend and descend in response to the commands from the controller 17.

Each of CCD cameras 7 for detecting sprouts in potatoes P are, as illustrated in FIG. 2, mounted to any one of eight supports rods 29 which are arranged around the support column 21 parallel thereto, spaced equally in a circumferential direction and pass through the upper, middle and lower rotary tables 10, 11 and 12. These CCD cameras 7 are positioned on the support columns 7 in the space between the middle and lower rotary tables 11, 12. The detecting parts 7a which analize image signals from these CCD cameras 7 to detect sprouts in the potatoes are, as shown in FIG. 1, mounted on the middle rotary table 11.

The CCD camera 7 provides the detecting part 7a with image information for distinguishing the color of the surface of the potato from the color of a sprout, and is provided with a prism which spectrally divides light from the object and with a plurality of linearly disposed unidimensional CCD light receiving elements which receive light spectrally divided by the prism and convert it into electronic signals. Since the spectral reflectance differs depending on the color of the object, the receiving elements output a spectral distribution which corresponds to that color. The detecting part 7a of the sprout detecting device is connected to the controller 17, as shown in FIG. 3; it has a memory part which stores color patterns for comparison, and converts the output of the unidimensional CCD from the CCD camera 7 by A/D conversion process and compare it with these standard color patterns to determine the color of the object. Standard color patterns corresponding to sprouts of potatoes are previously stored in the memory part. When the detecting part 7a detects a sprout by determining the color of the object by comparing the detected output with the previously stored standard patterns of potato sprouts, it outputs a corresponding signal to the controller 17.

The drill 8 for routering the sprouts from the potato held between the upper portion holding part 5 and the lower portion holding part 3 is driven by a motor M3 mounted on the lower rotary table 12. As shown in FIG. 6, the drill 8 comprises a spline shaft 73, a pulley 70 fitted on the spline shaft, a bit 71, and a joining member for joining the bit 71 to the spline shaft 73.

The base end of the drill 8 is connected to the air cylinder 26, so that the drill can be advanced from its retracted position toward the potato and withdrawn to its retracted position. The electromagnetic valve 25 for driving this air cylinder 26 is mounted on the middle rotary table 11.

Although not shown in the drawings, the pulley 70 has a built-in slip ring; the bit 71 is connected to the contact sensor 16 via the slip ring, and signals from the contact sensor 16 are inputted to the controller 17.

When the electromagnetic valve 25 operates, and air is sent under pressure into the air cylinder 26, the actuator 75 of the air cylinder 26 extends to move forward the spline shaft 75 while it rotates, thereby enabling the bit 71 at the end of the spline shaft 75 to router a sprout from the potato held between the upper portion holding part 5 and the lower portion holding part 3. When the point of the bit 71 touches the potato, the contact sensor 16 operates to input a detection signal to the controller 17.

As shown in FIG. 4, several pins 50 extending upward are embedded in the lower portion holding part 3 on the upper end of the lower rod 2. Similarly, several pins 54 (see FIG. 6) extending downward are embedded in the lower end of the upper rod 4. By sticking these pins 50, 54 into the potato from above and below, the potato can be held between the upper portion holding part 5 and the lower portion holding part 3 without slipping with respect thereto.

A guide body 6 is mounted directly above the lower rod 2 and directly below the upper rod 4. As shown in FIGS. 2 and 3, this guide body 6 is mounted on the end of a stay 24 fixed to the underside of the middle rotary table 11 so that the center of an opening in its upper side of the guide body 6 and the center of an opening in its lower side align with the common axis of the upper rod 4 and the lower rod 2. This guide body 6 comprises four or six pieces of guide plates 6a made from a thin plate, which are spaced equally in a circumferential direction to face each other. Each of these guide plates 6a is curved such that the lower end of a guide plate 6a comes closer to one another than the upper end thereof does so as to form a narrow passage with all the plates 6a at the central and lower position of the guide body 6. These four guide plates 6a are fixed at their upper end to the outer edges to the stay 24, as shown in FIG. 4, while their lower end edges are left free.

Next, the overall construction of the tuber sprout routering apparatus 1, in which the eight sprout routering units 1' constructed as described above are disposed around the support column 21, will be described.

As shown in FIGS. 1 and 2, a flat gear 28 of a large diameter is mounted to an upper part of the support column 21 extending upwardly from the central position of the base 20, coaxially with the axis of the support 21 and also rotatably with respect to the support column 21. Formed at about radially half way between the center and the periphery of this flat gear 28 and spaced equidistantly in a circle are depressions for receiving the upper ends of the eight support rods 29 and through bolt holes for bolts 40 to be passed through from above the flat gear 28 toward the upper end portions of the support rods 29 received into the corresponding depressions. The ends of the bolts 40 are screwed into threaded holes formed in the upper end portions of the Support rods 29, and the upper ends of the support rods 29 are thereby severally fixed to the flat gear 28.

Thus, the support rods 29 extend downward from the flat gear 28 and are uniformly spaced in a circle around and parallel with the support column 21. The portions slightly below the upper ends of these support rods 29 pass through the upper rotary table 10 and then through a bearing 30 below. By the eight support rods 29 passing through the upper rotary table 10 and the bearing 30 in this way, the upper rotary table 10 and the bearing 30 are, like the flat gear 28, positioned coaxially with the support column 21. The portions of the support rods 29 which pass through the bearing 30 and the portions slightly below the bearing 30 are threaded and have nuts 41 screwed thereon. Consequently, the upper rotary table 10 can be clamped between the flat gear 28 and the bearing 30 by means of the bolts 40 and the nuts 41. In this way, the upper rotary table 10 is not only supported by the support rods 29 but also rotatably mounted on the support column 21 by the bearing 30.

At about the middle level of the support column 21, the support column 21 passes through a center hole in the middle rotary table 11. The support rods 29 pass through this middle rotary table 11, a backing plate 34 above the middle rotary table 11 and a bearing 35 below the middle rotary table 11, whereby the middle rotary table 11, and the backing plate 34 and the bearing 35 are respectively positioned coaxially with the support column 21. The portions of the support rods 29 which pass through the backing plate 34 and the bearing 35 and the portions slightly above and below these portions are threaded, and nuts 42 are fitted on these threaded portions above the backing plate 34, while nuts 43 are fitted on the threaded portions below the bearing 35. As a result, the middle rotary table 11 can be fixed together with the bearing 35 and the backing plate 34 at a certain specific level on the support rods 29 by tightening these nuts 42 and 43. In this way, the middle rotary table 11 is not only supported by the support rods 29 but rotatably mounted on the support column 21 by the bearing 35.

Near the lower end of the support column 21, the support column 21 passes through a center hole in the lower rotary table 12. The support rods 29 pass through this lower rotary table 12, a backing plate 36 above the lower rotary table 12, and a bearing 37 below the lower rotary table 12, whereby the lower rotary table 12, the backing plate 36 and the bearing 37 are respectively positioned coaxially with the support column 21. Of each of the support rods 29, the portion near their lower end, portion through which the backing plate 36 passes and the portion slightly above that portion are threaded, and nuts 44 are fitted on these threaded portions above the backing plate 36 and nuts 45 are fitted on the threaded portions below the bearing 37. As a result, the lower rotary table 12 can be fixed together with bearing 37 and the backing plate 36 at a certain low level on the support rods 29 by tightening these nuts 44 and 45. In this way, the lower rotary table 12 is not only supported by the support rods 29 but rotatably mounted on the support column 21 through the bearing 37. The side of this bearing 37 located under the balls 37a abuts with a step portion 38 formed near the lower end of the support column 21, and downward forces on the lower rotary table 12 are supported by the step portion.

A bracket 31 is fixed near the upper end of the portion of the support column 21 which is above the upper rotary table 10. A motor M4, which is provided for rotating the flat gear 28 fixed to the upper rotary table 10 to thereby integrally rotate the upper rotary table 10, the middle rotary table 11, and the lower rotary table 12, is mounted on this bracket 31. A flat gear 33 which meshes with the flat gear 28 is mounted on the output shaft of this motor M4.

Rotation of the upper, middle and lower rotary tables 10, 11 and 12 is obtained by the rotational output of the table rotating motor M4 transmitted through the flat gear 33 to the flat gear 28. When the flat gear 33 rotates, the upper, middle and lower rotary tables 10, 11 and 12 rotate integrally, because they are linked to and supported each other by the support rods 29 as explained above. These rotary tables are continuously rotated at a speed of one revolution every fifteen seconds.

Next, the mechanisms for supplying potatoes to the tuber sprout routering apparatus 1 and discharging potatoes processed by the tuber sprout routering apparatus 1 out of the apparatus will be described.

As shown in FIG. 2, the potato feed device 23 comprises a feed passage 80 (of which only the downstream end portion is shown in FIG. 2) and two partition plates 70, 78, mounted in the end portion of the passage 80 in such a way that they can be freely inserted into and retracted from the feed passage 80, and solenoid valves 77, 79 which drive these partition plates 76, 78. The feed passage 80 is inclined so that it becomes higher gradually as the distance from the tuber sprout routering apparatus 1 increases. As shown in FIG. 2, the feed passage 80 has its end portion extending to a position slightly below and inward of the peripheral edge of the middle rotary table 11 so that a potato falling from the end of the feed passage 80 is surely caught in the upward opening of a guide body 6 of a sprout routering unit 1'.

The upstream side partition plate 76 and the downstream side partition plate 78 mounted in the feed passage 80 are inserted into and retracted from the feed passage 80 by the solenoids 77 and 79 respectively. When the downstream side partition plate 78 is projecting into the feed passage 80, while the upstream side partition plate 76 is retracted into the lower side of the feed passage 80, potatoes are brought into line in the upstream side of the feed passage from the downstream side partition plate 78. When the solenoid 77 operates to project the partition plate 76 into the feed passage 80, one potato only is isolated between the partition plate 76 and the partition plate 78. When the solenoid 79 then operates to retract the partition plate 78 to the underside of the feed passage 80, the one potato between the partition plate 76 and the partition plate 78 rolls downward and falls out of the feed passage 80.

The potato which falls out of the feed passage 80 falls into a guide body 6 above the rotary table 12. The solenoid 79 is then operated, and the downstream side partition plate 78 is projected into the feed passage 80, while the solenoid 77 is then operated, and the partition plate 76 is retracted to the underside of the feed passage 80. Thus potatoes are brought into line in the upstream side of the feed passage 80 from the downstream side partition plate 78 again. The above operation is carried out synchronously with the rotation of the rotary tables 10, 11 and 12.

Before being discharged from the apparatus, a potato that has been processed by the tuber sprout routering apparatus 1 is released from the grip between the upper portion holding part 5 and the lower portion holding part 3 by means described hereinafter, brought onto the surface of the lower rotary table and turned around together with the lower rotary table 12. When a potato moving around in this state reaches a guide plate 82 (see FIG. 7) mounted in a position which is fixed relative to the base 20 and is above the peripheral portion of the lower rotary table, the potato is prevented from moving around any further and guided radially outward by the guide plate 82, and heads for a discharge opening 81 (for example the upstream end of a discharge trough).

The means by which the potato is released from the grip between the upper portion holding part 5 and the lower portion holding part 3 before it is discharged out of the apparatus will now be described.

Figure 5:
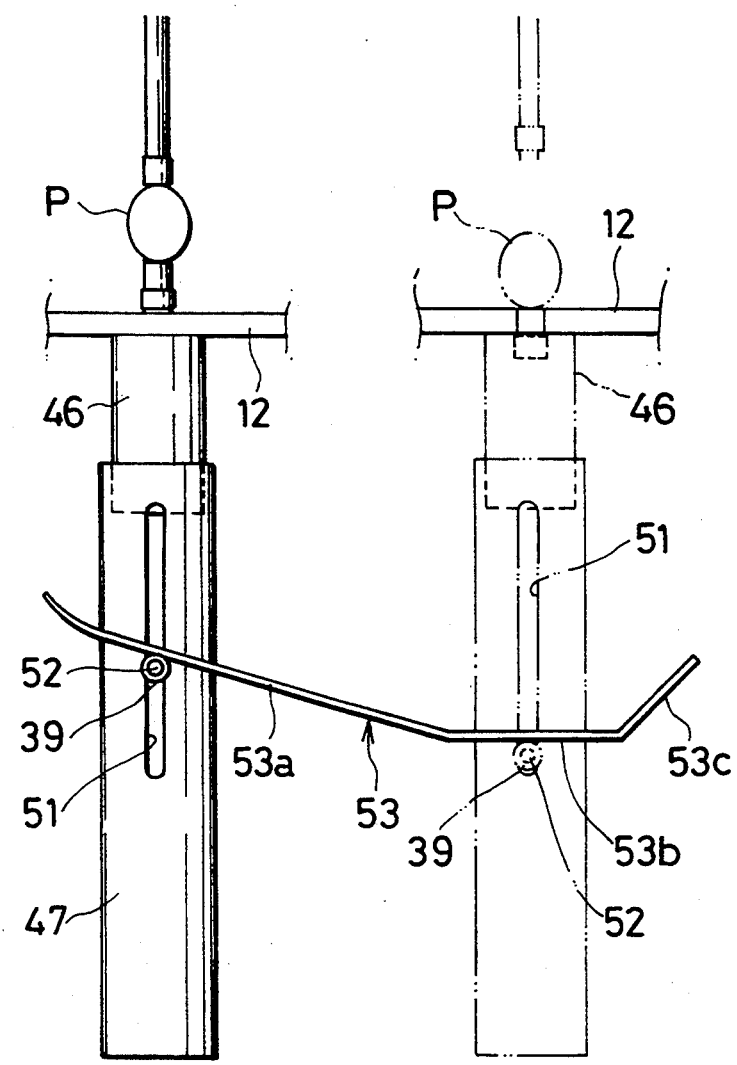
FIG. 5 is an enlarged side view of a portion of the apparatus for routering sprouts from tubers shown in FIG. 1.

As shown in FIG. 5, a guide hole 51 is provided in the outer side of the cylinder 47 and extends in the axial direction of the cylinder 47 which is below the peripheral portion of the lower rotary table 12 and rotates together with the lower rotary table 12. As shown in FIG. 4, a shaft 52 projects radially outward from a place on the periphery of the pushing plate 49 fixed to the lower end of the lower rod 2. As a result, the end of the shaft 52 on the pushing plate 49 inside the cylinder 47 projects outside through the guide hole 51. A cam follower 39 is mounted on the end of the shaft 52.

As shown in FIG. 2, the base 20 comprises a circular base portion and a vertical wall of a fixed height continuous with the periphery of the base portion, and as shown in FIGS. 2 and 5, an outer cam 53 which engages with the cam follower 39 and guides the cam follower 39 (and hence the lower rod 2) downward is formed facing a stretch of the inner side of this vertical wall extending from a certain portion of the wall on the upstream side in the direction of rotation of the lower rotary table 12 including the potato discharge opening to a certain portion on the downstream side of the lower rotary table 12. This outer cam 53 comprises a guide portion 53a which gradually descends toward the vicinity of the discharge opening from the upstream side in the direction of rotation of the lower rotary table 12, a horizontal portion 53b in the vicinity of the discharge opening, and a detachment guide portion 53c which ascends rather steeply towards downstream side in the direction of rotation of the lower rotary table 12 from the vicinity of the discharge opening.

Next, the timing of full process to be carried out by a sprout routering unit 1' within a time of one rotation of the upper middle and lower rotary tables 10, 11, 12, which is comprised of receiving a potato, detecting the existence of sprouts in the potato, removing the sprouts if detected, and discharging the potato of which such detection and removing steps were finished to outside the apparatus, will be explained below using the chart of FIG. 7.

Figure 7:
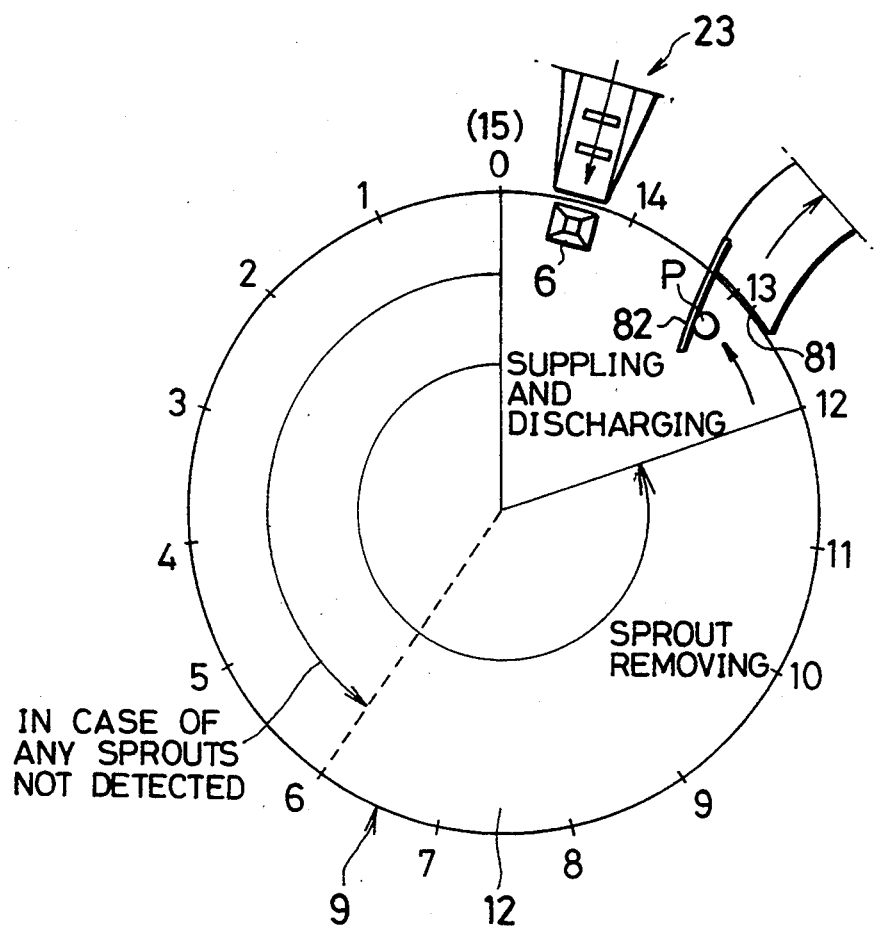
FIG. 7 is a view illustrating the sprout routering process to be carried out by the apparatus shown in FIG. 1.

In FIG. 7, reference numeral 9 denotes a circle serving as a coordinate line for showing the rotational position of the simultaneously rotating upper, middle and lower rotary tables 10, 11 and 12 with respect to the base 20. The diameter of this circle 9 corresponds to the diameters of the upper, middle and lower rotary tables 10, 11 and 12, and the center of the circle 9 corresponds to the axis of the support column 21 of the tuber sprout routering apparatus 1. Reference numerals 23, 81 and 82 denote the potato feed device, discharge opening and discharge guide plate respectively in their fixed positions with respect to the base 20. The reference numeral 6 denotes the guide body of a sprout routering unit 1' rotating together with the upper, middle and lower rotary tables 10, 11 and 12.

In this preferred embodiment, the upper, middle and lower rotary tables 10, 11 and 12 respectively make one revolution every fifteen seconds, and through this one revolution a sprout routering unit 1' completes all the necessary steps of the process. Thus, this coordinate circle 9 is divided into 15 equal parts, and the origin (zero seconds) is made to serve as the time to start the sprout routering operation (the time at which the upper portion holding part 5 and the lower portion holding part 3 start to hold the potato). That is, the numbers 0 to 14 arranged along the periphery of the circle 9 corresponds to the time elapsed (in seconds) from the start of the potato sprout routering operation. In this FIG. 7, the circle 9 corresponds to the size of the lower rotary table 12, and the potato P held between the upper portion holding part 5 and the lower portion holding part 3 can be considered to rotate counterclockwise at a constant speed just inside the periphery of the circle 9.

According to this FIG. 7, a potato having been supplied from the potato feed device 23 and passed through the guide body 6 starts to be held by the lower portion holding part 3 and the upper portion holding part 5 at the zero (seconds) position. After that, any sprouts present in the surface of the potato are detected and any detected sprouts are removed. The detection and removal of sprouts are carried out between 0 and 12 (seconds). When numerous sprouts are detected, sprout detection, sprout removal, resumption of sprout detection, sprout removal, resumption of sprout detection... are repeated within this 12-second period. On the other hand, the absence of the sprout in the surface of the potato is recognized within 6 seconds. Discharge of the potato takes place after approximately 13 seconds.

Next, the operation of the tuber sprout routering apparatus 1 will be explained.

The upper, middle and lower rotary tables 10, 11 and 12 are rotated at a speed of one revolution every fifteen seconds by the motor M4. The partition plates 76, 78 of the feed device 23 are driven to cause a potato to drop from the feed passage 80 into a guide body 6.

When a potato is fed into a guide body 6, as shown in FIG. 1, the potato P is once held in the narrowed portion in the middle of the guide body 6. At the same time, the motor M2 for raising and lowering the upper rod 4 starts to operate, whereby the pinion 65 rotates, and the upper rod 4 is moved downward at a fixed pitch by the rack 64 which meshes with the pinion 65, causing the upper rod 4 to move downward.

As shown in FIG. 4, when, as a result of the downward movement of the upper rod 4, the upper portion holding part 5 on the end of the upper rod 4 abuts with the potato P held in the guide body 6, the pins 54 erected on the lower end surface of the upper portion holding part 5 stick into the potato P, and, as a result, the potato P is held by the upper portion holding part 5. As the motor M2 for raising and lowering the upper rod 4 pushes the rack 64 further down, the potato P held by the upper portion holding part 5 moves downward together with the upper portion holding part 5. In this stage, the free ends of the guide plates 6a at the bottom of the guide body 6 are spread apart by the potato P, the lower portion of the potato P reaches the lower portion holding part 3, and the pins 50 on the upper end surface of the lower portion holding part 3 enter the lower portion of the potato P. As a result, the potato P is held without slipping between the upper portion holding part 5 and the lower portion holding part 3.

With the potato P thus held between the upper portion holding part 5 and the lower portion holding part 3, when the motor M2 for raising and lowering the upper rod 4 pushes the rack 64 further down, the downward movement of this rack 64 is transmitted through the upper portion holding part 5 and the potato P to the lower rod 2, and the pushing plate 49 on the lower end of the lower rod 2 descends to compress the coil spring 48 located inside the cylinder 47. Consequently, the upper portion holding part 5, the potato P and the lower portion holding part 3 descend at the same time, and in this process the potato P is released downward from the free end of the guide body 6. When this state is reached (For example, when the guide plates 6a of the guide body 6 have restored its original state after the potato has been released through the bottom of the guide body 6 from the state in which they were spread apart by the potato, and this event has been sensed by the movement of the guide plates 6a), the motor M1 for rotating the spline 55 of the upper rod 4 starts to operate.

As shown in FIG. 6, the rotational drive of the motor M1 is transmitted to the gear 62 through the pulley 57, the timing belt 58, the pulley 59 and the gear 61. When the gear 62 rotates, it causes the spline 55 which meshes with the gear 62 to rotate, and as a result the upper rod 4 is rotated.

Consequently the upper rod 4 is moved downward at a constant pitch by the motor M2 while being rotated by the motor M1. That is, the upper rod 4, the potato P and the lower rod 2 move downward integrally while rotating. While the potato P is being rotated by the motor M1, the CCD camera 7 operates and takes an image of the portion of the surface of the potato P hit by the optical axis of the CCD camera 7.

As the potato P moves downward at a constant pitch while being rotated, the entire surface of the potato P is scanned spirally by the optical axis of the CCD camera 7. The output of the unidimensional CCD of the CCD camera 7 undergoes the A/D conversion by the detecting part 7a for comparison with the standard color patterns corresponding to the sprouts of the potatoes in order to determine whether there is any sprout in the surface of the potato scanned by the CCD camera 7.

When the detecting part 7a determines that there is a sprout in the portion of the surface of the potato P being shot by the CCD camera 7, the motor M1 for rotating the potato P and the motor M2 for lowering the potato P at a constant pitch are stopped once respectively, and the detecting part 7a outputs a sprout detection signal to the controller 17. When the controller 17 receives the sprout detection signal, it sends a predetermined number of pulses to the driver 27. When this happens, the motor M1 turns the potato P by 90° from that position (the position in which the potato was being held when the sprout was detected) and then stops.

When the potato has thus turned by 90° and stopped, the point of the bit 71 of the drill 8 comes to face the sprout which was detected by the CCD camera 7. This is because the optical axis of the CCD camera 7 and the axis of the drill 8 intersect perpendicularly on the axis of the lower rod 2 (and the upper rod 4).

Next, the controller 17 rotates the drill 8 by activating the motor M3 for rotating the drill and operates the electromagnetic valve 25 so that air is sent under pressure into the air cylinder 26 to cause the actuator 75 of the air cylinder 26 to extend. As a result, the bit 71 of the drill 8 advances toward the potato P while being rotated and removes the sprout from the potato P which is held in a stationary state between the upper portion holding part 5 and the lower portion holding part 3. When the point of the drill bit 71 touches the potato as the drill bit 71 advances, the contact sensor 16 operates to input a detection signal to the controller 17.

When the controller 17 inputs the signal from the contact sensor 16, after a predetermined period of time, that is, after the time required for the sprout and the root of the sprout to be removed from the potato by the bit 71 has elapsed, the controller 17 switches over the operation of the electromagnetic valve 25 so that the air is discharged from the air cylinder 26, whereby the actuator 75 is retracted, and the bit 71 is withdrawn from the potato.

Then, in order to detect the sprouts that may exist in other parts of the potato, the controller 17 reactivates the motor M2 for raising and lowering the upper rod 2 and the motor M1 for rotating the upper rod 2. When another sprout is detected, the sprout is removed by repeating the operation described above.

Further, according to this preferred embodiment, the routering operation, from when the sprout in the potato is detected to when the routering by the drill 8 is completed (i.e. to when the drill 8 is withdrawn from the potato after removing the sprout) is carried out in approximately 0.5 seconds.

On the other hand, when the sprouts have not been detected at all and thus rotation and downward movement of the upper rod 4, potato and lower rod 2 have never been stopped until the lapse of 6 seconds, this means that the sprouts have never been detected within a section ranging from the lowermost level of a potato to the level of 100 mm upward, and, in such a case, it may be determined that no sprouts are existing in the surface of the potato. At this point the potato sprout detection operation comes to an end.

As described above, it takes 6 seconds for the optical axis of the CCD camera 7 to scan the entire surface of the potato, while it takes 0.5 seconds to remove one sprout, and the potato sprout routering operation must be completed within 12 seconds from the start of scanning; this means that, in total, [12−6]/0.5=12 sprouts can be removed from a potato.

When sprouts were detected in the potato and the last sprout has been removed, or when no sprouts were detected and the detection operation has been completed, the potato, still held by the upper portion holding part 5 and the lower portion holding part 3, is made to move downstream toward the discharge opening 81 as the upper, middle and lower rotary tables 10, 11 and 12 rotate. However, the motor M2 for raising and lowering the upper rod 4 continues to run during this movement of the potato, whereby the upper rod 4, the potato and the lower rod 2 are integrally pushed downward, and when the potato P reaches the 12-second position shown in FIG. 7, whereby the cam follower 39, urged upward by the coil spring 48 and fixed to the pushing plate 49, is made to contact with the underside of the start end of the guide portion 53a of the outer cam 53, as shown in the left hand drawing in FIG. 5. It is not necessary for the motor M1, which rotates the potato P, to be running during this time.

When 12 seconds have elapsed from the time at which the potato P started to be held by the lower portion holding part 3 and the upper portion holding part 5 in the sprout routering unit 1', as shown in FIG. 7, the potato P comes to a position facing the discharge opening 81. In the process for the potato to reach this discharge position from the 12-second position mentioned above, the cam follower 39 is guided by the guide portion 53a of the outer cam 53 formed on the inner side of the side wall of the base 20, and the lower rod 2 descends against the resistance of the coil spring 39.

Immediately before the cam follower 39 reaches the start end of the horizontal portion 53b of the outer cam 53, the motor M2 for rising and lowering of the upper rod 4 is run in the opposite direction to that in which it has been until that time to cause the upper rod 4 to rise. Then, the potato P comes off the pins 54 of the upper portion holding part 5 on the lower end of the upper rod 4 by the gravity, and the potato become held at its bottom only with the pins 50 of the lower portion holding part 3 of the lower rod 2.

When the lower rotary table 12 rotates further, and the cam follower 39 moves from the guide portion 53a of the outer cam 53 to the horizontal portion 53b, as shown in FIG. 8, the lower portion holding part 3 on the upper end of the lower rod 2 descends into the recess portion 46a in the support 46. At this point the potato P still has the pins 50 of the lower portion holding part 3 stuck into its lower portion and rotates together with the lower rotary table 12.

While the cam follower 39 is moving along the horizontal portion 53b of the outer cam 53 as the lower rotary table 12 rotates, the potato P comes to abut with the guide plate 82 shown in FIG. 7 and is forcibly moved outward along the guide plate 82, whereby the potato P comes off the pins 50 of the lower portion holding part 3 and is guided out of the apparatus through the discharge opening 81, that is, discharged from the lower rotary table 12 to the outside.

As the lower rotary table 12 rotates further after the potato P has been discharged through the discharge opening 81, the cam follower 39 moves from the horizontal portion 53b onto the detachment guide portion 53c of the outer cam 53. This detachment guide portion 53c of the outer cam 53 is inclined steeply upward in the downstream direction. While the cam follower 39 is moving in engagement with this detachment guide portion 53c, the restoring force of the coil spring 48, which has been compressed by the pushing plate 49, acts and tile cam follower 39 is securely guided by this detachment guide portion 53c.

When the cam follower 39 separates from the outer cam 53, this sprout routering unit 1' returns to the standby state as shown in FIG. 3. Then, when the sprout routering unit 1' moves around to the position beyond the 14-second position of FIG. 7, in which it faces the potato feed device 23, the next potato is fed into it from this feed device 23, and the sprout routering unit 1' enters the next routering operation cycle.

As described above, the potato sprout routering process to be carried out by any sprout routering unit 1' is completed within one simultaneous rotation at constant speed of the lower rotary table 12, the middle rotary table 11 and the upper rotary table 10 on which the parts constituting that sprout routering unit are mounted. Also, as described above, eight sets of the sprout routering units 1' are mounted at equal intervals and circumferentially around the lower rotary table 12, the middle rotary table 11 and the upper rotary table 10. Therefore, each sprout routering unit 1' carries out the same operation as that of the preceding one, though there is a phase difference of 45° in terms of the rotation the lower rotary table 12 (360/8=45°).

Thus, while the lower rotary table 12, the middle rotary table 11, and the upper rotary table 10 make one integral revolution in 15 seconds, 8 potatoes in total can be processed.

What is claimed is:

1. An apparatus for routering sprouts from a tuber, comprising one or more rotary tables rotatably mounted on a support column projecting upward from a base, a drive device for rotating the rotary table in a predetermined direction at a predetermined speed with respect to the base, a tuber feed device and a tuber discharge device mounted respectively in the vicinity of the peripheral edge of the rotary table in fixed positions with respect to the base, and a plurality of sprout routering units of substantially the same construction which are mounted on the rotary table at equal intervals in a circumferential direction and rotate about the support column together with the rotary table, each of the sprout routering units comprising:

a tuber holding part for holding the upper and lower portions of a tuber and giving rotational motion and linear motion thereto;

a guide body for catching a tuber falling from the tuber feed device and guiding it into the tuber holding part;

a tuber sprout detecting part provided with a camera whose optical axis is directed at a tuber being held and given rotational and linear motion by the tuber holding part;

a tuber sprout routering part having a blade for removing a sprout from a tuber; and a controller for causing the sprout detecting part to operate while giving rotational motion and linear motion to the tuber holding part, causing, on receiving a sprout detection signal from the tuber sprout detecting part, the tuber holding part to rotate until the detected tuber sprout faces the blade of the tuber sprout routering part and then causing the tuber sprout routering part to operate, wherein during one revolution of the rotary table a sprout routering unit performs a series of operations such as receiving a tuber from outside the apparatus, detecting tuber sprout, routering tuber sprout and discharging the processed tuber outside the apparatus.

2. An apparatus for routering sprouts from a tuber comprising one or more rotary tables rotatably mounted on a support column projecting upward from a base, a drive device for rotating the rotary table in a predetermined direction at a predetermined speed with respect to the base, a tuber feed device and a tuber discharge device mounted in the vicinity of the peripheral edge of the rotary table in fixed positions with respect to the base, and a plurality of sprout routering units of substantially the same construction which are mounted on the rotary table at equal intervals in a circumferential direction and rotate about the support column together with the rotary table, each of the sprout routering units comprising:

a guide body for catching a tuber falling from the tuber feed device;

an upper rod having its lower end fitted with an upper portion holding part for holding the upper portion of a tuber;

a lower rod having its axis aligned with the axis of the upper rod and having its upper end fitted with a lower portion holding part for holding the lower portion of a tuber;

an upper rod drive part for giving to the upper rod rotational motion around its axis and linear motion along its axis;

a tuber sprout detecting part provided with a camera having an optical axis intersecting perpendicularly with the common axis of the upper rod and the lower rod;

a tuber sprout routering part having a drill with its axis intersecting perpendicularly with the common axis of the upper and lower rods but not overlapping with the optical axis of the camera of the tuber sprout detecting part, a drill drive part for rotating the drill about its axis and giving the drill linear motion along its axis and a contact sensor for detecting when during this linear motion the drill comes into contact with the surface of a tuber; and a controller for causing the upper rod drive part to rotate the upper rod at a constant speed and also to move axially at a constant speed while the tuber sprout routering part is in operation, controlling the upper rod to rotate by the angle formed between the optical axis of the camera of the tuber sprout detecting part and the axis of the drill on receiving the sprout detection signal from the tuber sprout detecting part, and controlling the drill drive part to advance while being rotated after the lapse of predetermined time from the detection of the sprout, and to advance further during a predetermined time starting when it is detected that the point of the drill has come into contact with the surface of the tuber and retract after the lapse of the predetermined time, wherein, during one revolution of the rotary table, any one of the sprout routering units receives a tuber from outside the apparatus, and performs a series of operations such as detecting tuber sprout, processing detected sprout and discharging the processed tuber outside the apparatus.

3. An apparatus for routering sprouts from a tuber according to claim 1, wherein:

the rotary table comprises a plurality of integrally rotating tables of substantially the same diameter, and elements constituting a tuber sprout routering unit are mounted on but by being distributed among the plurality of tables.

4. An apparatus for routering sprouts from a tuber according to claim 2, wherein:

the lower rod is fitted to the rotary table in such a way that it is movable in a direction perpendicular to a surface of the table against the urging force of a spring, and a cam follower is mounted on the lower end of the lower rod;

a guide which engages with the cam follower is formed on the base in the vicinity of the tuber discharge device; and the lower rod of a sprout routering unit opposing tile tuber discharge device as the rotary table rotates moves downward against the urging force of the guide spring caused by the engagement of the cam follower with the guide, so that most of the lower portion holding part comes below the level of the upper surface of the rotary table.

5. An apparatus for routering sprouts from a tuber according to claim 1 wherein:

the tuber feed device comprises a tuber feed passage having at its downstream end a discharge opening located above the guide body of a sprout routering unit and inclined to descend towards its downstream side, two partition plates installed parallelly with a predetermined interval at the downstream end of the tuber feed passage, and a partition plate drive device designed to drop the tubers, one at a time, into the guide body of the tuber routering unit by retreating these partition plates projecting from the bottom of the tuber feed passage to or below the level of the bottom thereof.

6. An apparatus for routering sprouts from a tuber according to claim 2, wherein:

the tuber discharge device is disposed on the base in a position slightly upstream of the tuber feed device in the direction of the rotation of the rotary table and is provided with a guide plate for abutting with the side surface of a tuber moving together with the rotary table to guide the tuber outward from the table.

* * * * *